W. HARDER,

Assignor to E. HARDER.

Thill Coupling.

No. 9,278. Reissued July 6, 1880.

Witnesses;
Chas. R. Dudley
Austin Bemis

Inventor;
William Harder
By his atty. Allen Webster.

PETERS, PHOTO-LITHOGRAPHER, WASHINGTON, D. C.

UNITED STATES PATENT OFFICE.

WILLIAM HARDER, OF PITTSFIELD, MASSACHUSETTS, ASSIGNOR TO EUGENE HARDER, OF SAME PLACE.

THILL-COUPLING.

SPECIFICATION forming part of Reissued Letters Patent No. 9,278, dated July 6, 1880.

Original No. 225,011, dated March 2, 1880. Application for reissue filed May 26, 1880.

*To all whom it may concern:*

Be it known that I, WILLIAM HARDER, of Pittsfield, in the county of Berkshire and State of Massachusetts, have invented certain new and useful Improvements in Thill-Couplings; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to thill-couplings of that class provided with elastic means for holding the coupling-pin in position.

Heretofore the coupling-pin has been held in position by means of a U-shaped spring-shackle formed with a hole near each end to take upon the pointed ends of the coupling-pin projecting outside the clips. Also, a headed coupling-pin has been held in position by means of a flat spring with turned-up ends, one end of said spring resting against the head of the coupling-pin and the other upturned end passed over the pointed end of the coupling-pin and resting against the clip.

Thill-couplings of these constructions are objectionable, for the reasons that a pin of uniform diameter throughout is employed, and whenever the holding-spring yields the thill will rattle.

The main object of my improvement is to make an anti-rattler thill-coupling of this class, and one that will take up the wear automatically.

Therefore the improvement consists, in combination with a thill-coupling, of a tapering pin and a holding-spring to prevent rattling of the thill.

The improvement also consists in the combination, with parts constituting the main part of a thill-coupling, of the tapering pin having a projecting end and a U-shaped elastic spring, as will be hereinafter more fully set forth.

Figure 1:
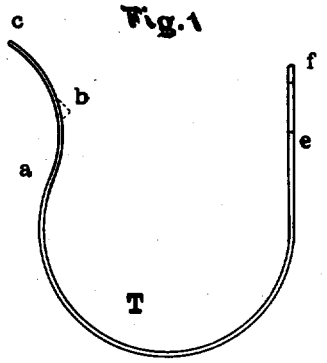
Figure 2:
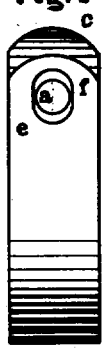
Figure 3:
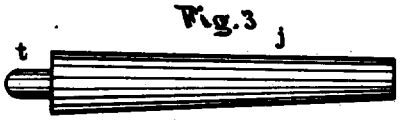

In the accompanying drawings, in which similar letters of reference indicate like parts, Figure 1 is a side view of the spring. Fig. 2 is a view of the same as seen from one side. Fig. 3 is a side view of the pin, and Fig. 4 is a view of the device as applied to a carriage-coupling.

There are very many places in which a coupling is needed, which, while being simple and easy to use, will automatically take up the wear of the parts and prevent the disagreeable rattling which is found in most couplings made.

The drawings represent my device as arranged to be used on a carriage.

Figure 4:
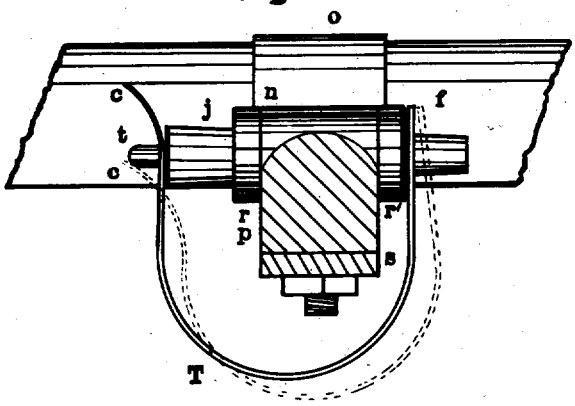

In Fig. 4 a part of an axle is shown with the ordinary part of a carriage-coupling attached, the parts $r$ $r'$ forming a socket, into which the piece or tongue $n$ fits. A section of a thill is shown bolted to the usual projecting piece from the tongue $n$. The tapering pin $j$ passes through the pieces $r$, $r'$, and $n$, as shown in the drawings. The end $f$ of the spring T passes over the smaller end of the pin and bears against the piece $r'$, while the other end, $c$, of the spring bears against the other end of the pin, thus forcing the pin in the direction of the end $f$.

I employ a tapering pin for the reason that it will take up the wear, keep the parts together tightly, and effectually do away with the rattling.

The hole in the end $f$ of the spring is made large enough to allow the tipping of the spring requisite to get it in place.

The position of the spring while being placed on the pin is shown in dotted lines in Fig. 4. In this position a slight pressure will force the spring in place. On the end of the pin I make the projection $t$, over which the end $c$ of the spring passes.

This particular manner of holding the spring in place I do not confine myself to, as other arrangements may be made. For instance, a projection may be formed on the spring, as shown in dotted lines at $b$, Fig. 1, and a recess made in the end of the pin to receive the same.

Having therefore described my invention, what I claim as new, and desire to secure by Letters Patent, is—

1. In a thill-coupling, the combination of a tapering pin and a U-shaped holding-spring, whereby rattling of the thill is prevented, substantially as described.

2. In a thill-coupling of the class described, the combination of a tapering pin formed at its larger end with a projection, *t*, and the U-shaped spring, one end of which is passed over the smaller end of the tapering pin and the other end passed over the projection of the larger end of the tapering pin, whereby wear is taken up automatically and rattling prevented, substantially as described.

In testimony that I claim the foregoing I have hereunto set my hand this 19th day of May, A. D. 1880.

WILLIAM HARDER.

Witnesses:
ALLEN WEBSTER,
GEO. ELSEY.